Long & Patten,
Cotton Press.
No. 112,822. Patented Mar. 21, 1871.

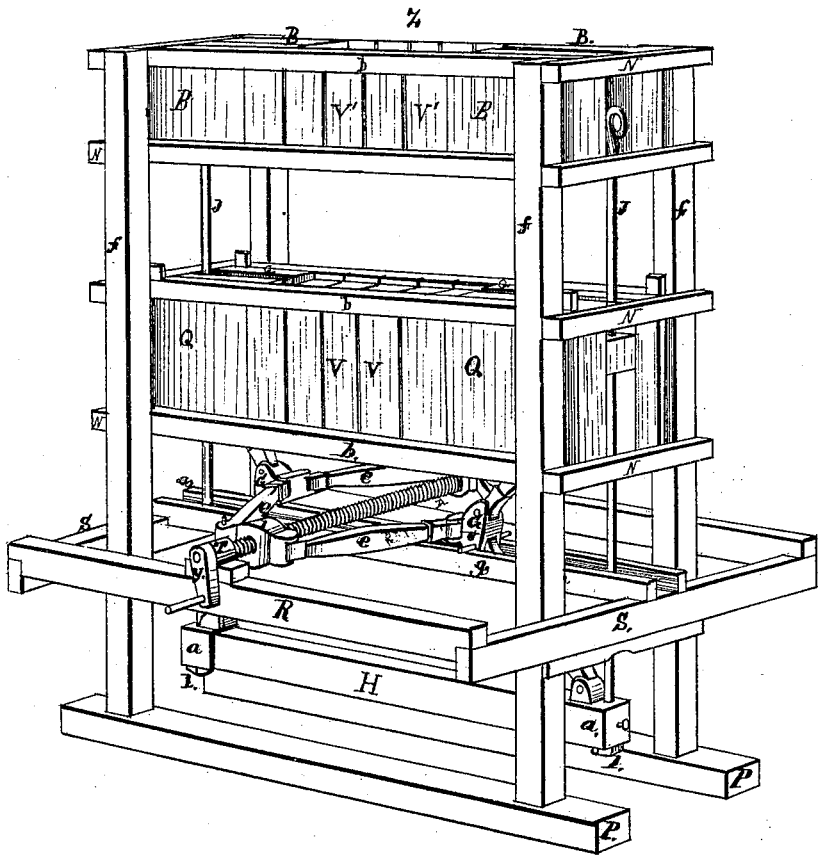

Witnesses,
F. A. Scanlan
H. A. Daniels

Inventors,
Eli W. Long
Isaac N. Patten
By Myers & Co
Attys:

N. PETERS, PHOTO-LITHOGRAPHER, WASHINGTON, D.C.

UNITED STATES PATENT OFFICE.

ELI W. LONG AND ISAAC N. PATTEN, OF MEMPHIS, TENNESSEE.

IMPROVEMENT IN COTTON-PRESSES.

Specification forming part of Letters Patent No. 112,822, dated March 21, 1871.

We, ELI W. LONG and ISAAC N. PATTEN, of the city of Memphis and State of Tennessee, have invented certain Improvements upon our Cotton-Presses patented December 20, 1870, of which the following is a specification:

*Description of the Accompanying Drawing.*

Figure 3:
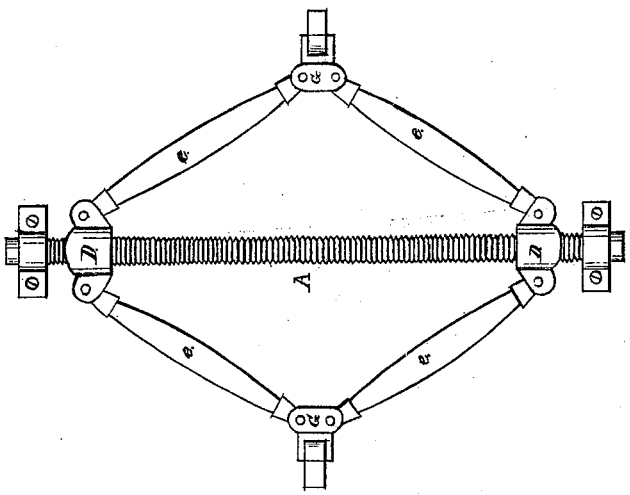
Figure 2:
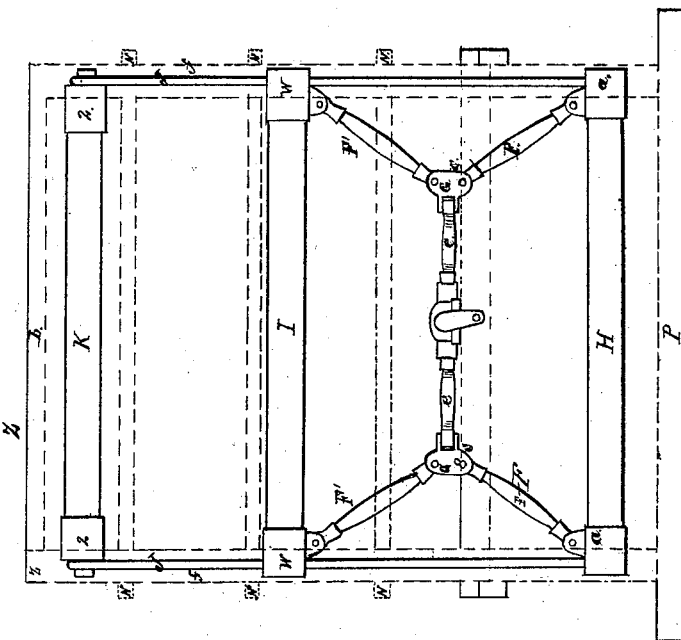

Figure 1 is a linear perspective of a machine embodying our invention. Fig. 2 is a plan, showing the transverse screw A with levers attached thereto. Fig. 3 is a vertical transverse section of our invention.

Our invention relates to an improved press for baling cotton.

It consists of the right-and-left screw A, with nuts D, arms or levers e e e e, connected, by toggle-joints G G, with dummy H, platens I and K, rods J J, and frame Z, and their combination and arrangement, as shown and described.

Z is a frame composed of the vertical pieces f f f f, the longitudinal pieces b, the lateral pieces N, and the pieces P, which support the device.

The two parallel longitudinal pieces g g, while strengthening the frame, serve as a guide for the toggle-joints G G and the machinery connected therewith.

V and V' are vertical slots, which are so arranged as to form a recess for the reception of the material, but which are located sufficiently apart to admit the bale to be strapped when under pressure.

To the vertical pieces f the auxiliary frame R is rigidly attached by the lateral pieces s s, the longitudinal parts of the frame R forming rests for the journal-boxes T of the screw A.

A is a right-and-left screw, whose journal-boxes T are rigidly attached to the frame R. Said screw may be rotated either by cranks Y, located at either end thereof, or by pulleys thereto attached, or by any other obvious or well-known method of communicating force.

D D are nuts, which, by the rotation of the right-and-left screw A, are caused to approach or recede at the will of the operator. To said nuts are hinged the levers or arms e e e e, as shown in Fig. 3, their several opposite ends being connected, by the toggle-joints G G, with the auxiliary levers F F and F' F'.

G G are metallic toggle-joints, connecting the arms or levers e e e e with the auxiliary arms or levers F F and F' F'.

The pivotal pieces v v in the toggle-joints G G, which joint the arms F F to said toggle-joints, project transversely across the longitudinal guides g g, and thereby form a rest or auxiliary guide for the levers F.

The levers or arms F F, which connect with the toggle-joint at one end, as aforesaid, are hinged or jointed at their opposite ends to the dummy H.

H is a dummy, the bar thereof at either end being provided with a metallic cap, a, through which the rods J J project, and said caps are so formed as to furnish, at their upper part, bearings for jointing thereto the levers F F.

The arms or levers F' F' are hinged to the toggle-joints G G at their lower ends, and at their upper ends are provided with metallic caps W W, having vertical apertures therein, through which project the rods J J, on which they slide, and by which they are guided when the screw A is rotated, and into said caps the ends of the bar of the platen I are respectively inserted.

J J are vertical rods, which project through the metallic caps a a on the dummy H at their nether ends and are curved into rings at their apexes. Their lower ends are threaded and screwed through said caps, and additionally strengthened by the nuts 1.

The bearings of the platen K are metallic and horizontal projections from the caps 2, fitted upon the bar thereof, and said projections are fitted into the rings provided respectively in the apexes of the rods J J, as aforesaid.

The studs B and Q not only strengthen the frame, but guide the bars of the platens K and I. When the platen I is lowered the platen K simultaneously ascends, and, in conjunction with the slats V and V', forms a recess or receptacle for the material.

In practice, the platen I is first sufficiently lowered by the rotation of the screw A to provide a suitable receptacle for the material to be operated, whereupon the motion of the screw A is rotated in a reverse direction, and a compound-lever force communicated to the toggle-joint G, which force or power is again multiplied by the arms or levers radiating therefrom.

Said force carries the platen I upward, and causes the platen K to descend, thereby pressing the material between the upper and nether platens.

Claims.

1. The combination and arrangement of the horizontal screw A with nuts D, arms *e e e e*, toggle-joints G G, and arms or levers F F and F' F', constructed substantially as shown and described.

2. The combination and arrangement of the arms F F and F' F', toggle-joint G, rods J J, dummy H, and platens K and I, constructed substantially as shown and specified.

In testimony of this our application for Letters Patent for the aforesaid-described cotton-press we hereunto subscribe our names.

ELI W. LONG.
ISAAC N. PATTEN.

Witnesses:
   F. A. SCANLAN,
   M. B. TREZEVANT,
   R. ADAMS.